(12) United States Patent
Leung et al.

(10) Patent No.: US 10,324,948 B1
(45) Date of Patent: Jun. 18, 2019

(54) NORMALIZING INGESTED SIGNALS

(71) Applicant: Banjo, Inc., Park City, UT (US)

(72) Inventors: KW Justin Leung, Redwood City, CA (US); Michael Avner Urbach, Redwood City, CA (US); Armando Guereca-Pinuelas, Redwood City, CA (US); Christopher Latko, Redwood City, CA (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/038,537

(22) Filed: Jul. 18, 2018

Related U.S. Application Data

(60) Provisional application No. 62/664,001, filed on Apr. 27, 2018, provisional application No. 62/667,616, filed on May 7, 2018, provisional application No. 62/686,791, filed on Jun. 19, 2018.

(51) Int. Cl.
*G06F 16/25* (2019.01)
*G06F 16/28* (2019.01)

(52) U.S. Cl.
CPC .......... *G06F 16/254* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 8,161,504 B2 | 4/2012 | Newell | |
| 8,208,798 B2 | 6/2012 | Jung et al. | |
| 8,380,050 B2 | 2/2013 | Kummer | |
| 8,396,467 B2 | 3/2013 | Bonnefoy et al. | |
| 8,782,041 B1 | 7/2014 | Daniel | |
| 8,938,089 B1 | 1/2015 | Postelnicu et al. | |
| 9,106,804 B2 | 8/2015 | Roberts et al. | |
| 9,158,974 B1 | 10/2015 | Laska et al. | |
| 9,230,250 B1 | 1/2016 | Parker et al. | |
| 9,324,093 B2 | 4/2016 | Setty et al. | |

(Continued)

OTHER PUBLICATIONS

Office Action received in U.S. Appl. No. 16/121,917, dated Nov. 2, 2018, 20 pages.

(Continued)

*Primary Examiner* — Amresh Singh
(74) *Attorney, Agent, or Firm* — Michael B. Dodd

(57) ABSTRACT

The present invention extends to methods, systems, and computer program products for normalizing ingested signals. In general, signal ingestion modules ingest different types of raw structured and/or raw unstructured signals on an ongoing basis. The signal ingestion modules normalize raw signals into normalized signals having a Time, Location, Context (or "TLC") dimensions. A Time (T) dimension can be a time of origin or alternatively "event time" of a signal. A Location (L) dimension can be anywhere across a geographic area, such as, a country (e.g., the United States), a State, a defined area, an impacted area, an area defined by a geo cell, an address, etc. A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

19 Claims, 9 Drawing Sheets

(56) References Cited

U.S. PATENT DOCUMENTS

| | | |
|---|---|---|
| 9,449,229 B1 | 9/2016 | Laska et al. |
| 9,466,196 B2 | 10/2016 | Smith et al. |
| 9,466,197 B2 | 10/2016 | Hildick-Pytte |
| 9,501,915 B1 | 11/2016 | Laska et al. |
| 9,609,380 B2 | 3/2017 | Laska et al. |
| 9,613,068 B2 | 4/2017 | Tsirogiannis et al. |
| 9,680,919 B2 | 6/2017 | McDaid et al. |
| 9,699,523 B1 | 7/2017 | Cronin et al. |
| 9,703,827 B2 | 7/2017 | Clark et al. |
| 9,753,913 B1 | 9/2017 | Kursun et al. |
| 9,858,322 B2 | 1/2018 | Theimer et al. |
| 9,880,769 B2 | 1/2018 | Chen et al. |
| 9,898,542 B2 | 2/2018 | Hayden |
| 9,940,580 B2 | 4/2018 | Faith et al. |
| 9,992,248 B2 | 6/2018 | Fox et al. |
| 10,034,029 B1 | 7/2018 | Barua et al. |
| 10,043,006 B2 | 8/2018 | Puri et al. |
| 10,043,551 B2 | 8/2018 | Anderson et al. |
| 10,078,537 B1 | 9/2018 | Nanda et al. |
| 2005/0183143 A1 | 8/2005 | Anderholm et al. |
| 2006/0235833 A1 | 10/2006 | Smith et al. |
| 2006/0267783 A1 | 11/2006 | Smith |
| 2010/0166309 A1 | 7/2010 | Hull |
| 2011/0040760 A1 | 2/2011 | Fleischman et al. |
| 2011/0311140 A1 | 12/2011 | Urbach et al. |
| 2012/0023245 A1 | 1/2012 | Mouquet et al. |
| 2012/0259842 A1 | 10/2012 | Oman et al. |
| 2013/0006627 A1 | 1/2013 | Guthery et al. |
| 2013/0083036 A1 | 4/2013 | Cario et al. |
| 2013/0214925 A1 | 8/2013 | Weiss |
| 2014/0025781 A1 | 1/2014 | Ye et al. |
| 2014/0067951 A1* | 3/2014 | Sheinfeld ............... H04L 67/22 709/204 |
| 2014/0088744 A1 | 3/2014 | Levien et al. |
| 2014/0328570 A1 | 11/2014 | Cheng et al. |
| 2015/0095333 A1 | 4/2015 | Porpora et al. |
| 2015/0220835 A1 | 8/2015 | Wilson et al. |
| 2015/0294233 A1 | 10/2015 | Aultman et al. |
| 2016/0139242 A1 | 5/2016 | Dupray et al. |
| 2016/0192166 A1 | 6/2016 | deCharms |
| 2016/0267144 A1 | 9/2016 | Manimaran |
| 2016/0283860 A1 | 9/2016 | Pycock et al. |
| 2017/0011053 A1 | 1/2017 | Hubbard et al. |
| 2017/0032138 A1 | 2/2017 | Navda et al. |
| 2017/0115648 A1 | 4/2017 | Nixon et al. |
| 2017/0139393 A1 | 5/2017 | Boss et al. |
| 2017/0139956 A1 | 5/2017 | Qiao et al. |
| 2017/0142200 A1* | 5/2017 | Kodner ................... H04L 67/22 |
| 2017/0180944 A1 | 6/2017 | Bhatt |
| 2017/0257654 A1 | 9/2017 | Branch et al. |
| 2017/0318336 A1 | 11/2017 | Hackett et al. |
| 2017/0366896 A1 | 12/2017 | Adsumilli et al. |
| 2018/0101595 A1 | 4/2018 | Bastide et al. |
| 2018/0172454 A1 | 6/2018 | Ghadiok et al. |
| 2018/0176607 A1 | 6/2018 | Shaw et al. |
| 2018/0192158 A1 | 7/2018 | Smith et al. |
| 2018/0268868 A1 | 9/2018 | Salokannel et al. |
| 2018/0276054 A1 | 9/2018 | Furuichi et al. |
| 2018/0287797 A1 | 10/2018 | Banerjee et al. |
| 2018/0300124 A1 | 10/2018 | Malladi et al. |
| 2018/0313798 A1 | 11/2018 | Chokshi et al. |

OTHER PUBLICATIONS

Office Action received in U.S. Appl. No. 16/131,637, dated Nov. 28, 2018, 37 pages.

Office Action received in U.S. Appl. No. 16/106,530, dated Oct. 26, 2018, 15 pages.

Office Action received in U.S. Appl. No. 16/121,762, dated Nov. 19, 2018, 12 pages.

Office Action received in U.S. Appl. No. 16/106,436, dated Nov. 8, 2018, 15 pages.

Office Action received in U.S. Appl. No. 16/101,208, dated Nov. 14, 2018, 15 pages.

Office Action received in U.S. Appl. No. 16/121,847, dated Nov. 23, 2018, 39 pages.

* cited by examiner

NORMALIZING INGESTED SIGNALS

CROSS-REFERENCE TO RELATED APPLICATIONS

This application claims the benefit of U.S. Provisional Patent Application Ser. No. 62/664,001, entitled "Normalizing Different Types Of Ingested Signals Into A Common Format", filed Apr. 27, 2018 which is incorporated herein in its entirety. This application claims the benefit of U.S. Provisional Patent Application Ser. No. 62/667,616, entitled "Normalizing Different Types Of Ingested Signals Into A Common Format", filed May 7, 2018 which is incorporated herein in its entirety. This application claims the benefit of U.S. Provisional Patent Application Ser. No. 62/686,791 entitled, "Normalizing Signals", filed Jun. 19, 2018 which is incorporated herein in its entirety.

BACKGROUND

Background and Relevant Art

Data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

Extract, transform, and load (ETL) refers to a technique that extracts data from data sources, transforms the data to fit operational needs, and loads the data into an end target. ETL systems can be used to integrate data from multiple varied sources, such as, for example, from different vendors, hosted on different computer systems, etc.

ETL is essentially an extract and then store process. Prior to implementing an ETL solution, a user defines what (e.g., subset of) data is to be extracted from a data source and a schema of how the extracted data is to be stored. During the ETL process, the defined (e.g., subset of) data is extracted, transformed to the form of the schema (i.e., schema is used on write), and loaded into a data store. To access different data from the data source, the user has to redefine what data is to be extracted. To change how data is stored, the user has to define a new schema.

ETL is beneficially because it allows a user to access a desired portion of data in a desired format. However, ETL can be cumbersome as data needs evolve. Each change to the extracted data and/or the data storage results in the ETL process having to be restarted.

BRIEF SUMMARY

Examples extend to methods, systems, and computer program products for normalizing ingested signals.

In general, signal ingestion modules ingest different types of raw structured and/or raw unstructured signals on an ongoing basis. The signal ingestion modules normalize raw signals across multiple data dimensions to form normalized signals. In one aspect, raw signals are normalized into normalized signals having Time, Location, and Context (or "TLC") dimensions. A Time (T) dimension can include a time of origin or alternatively an "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from (inferred and/or express) signal features of the raw signal. A single source probability can reflect a mathematical probability or approximation of a mathematical probability of an event (e.g., fire, accident, weather, police presence, etc.) actually occurring. A single source classifier can be configured to compute a single source probability for a single event type or to compute a single source probability for each of a plurality of different event types.

As such, single source probabilities and corresponding probability details can represent a Context (C) dimension. Probability details can indicate (e.g., can include a hash field indicating) a probabilistic model and (express and/or inferred) signal features considered in a signal source probability calculation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
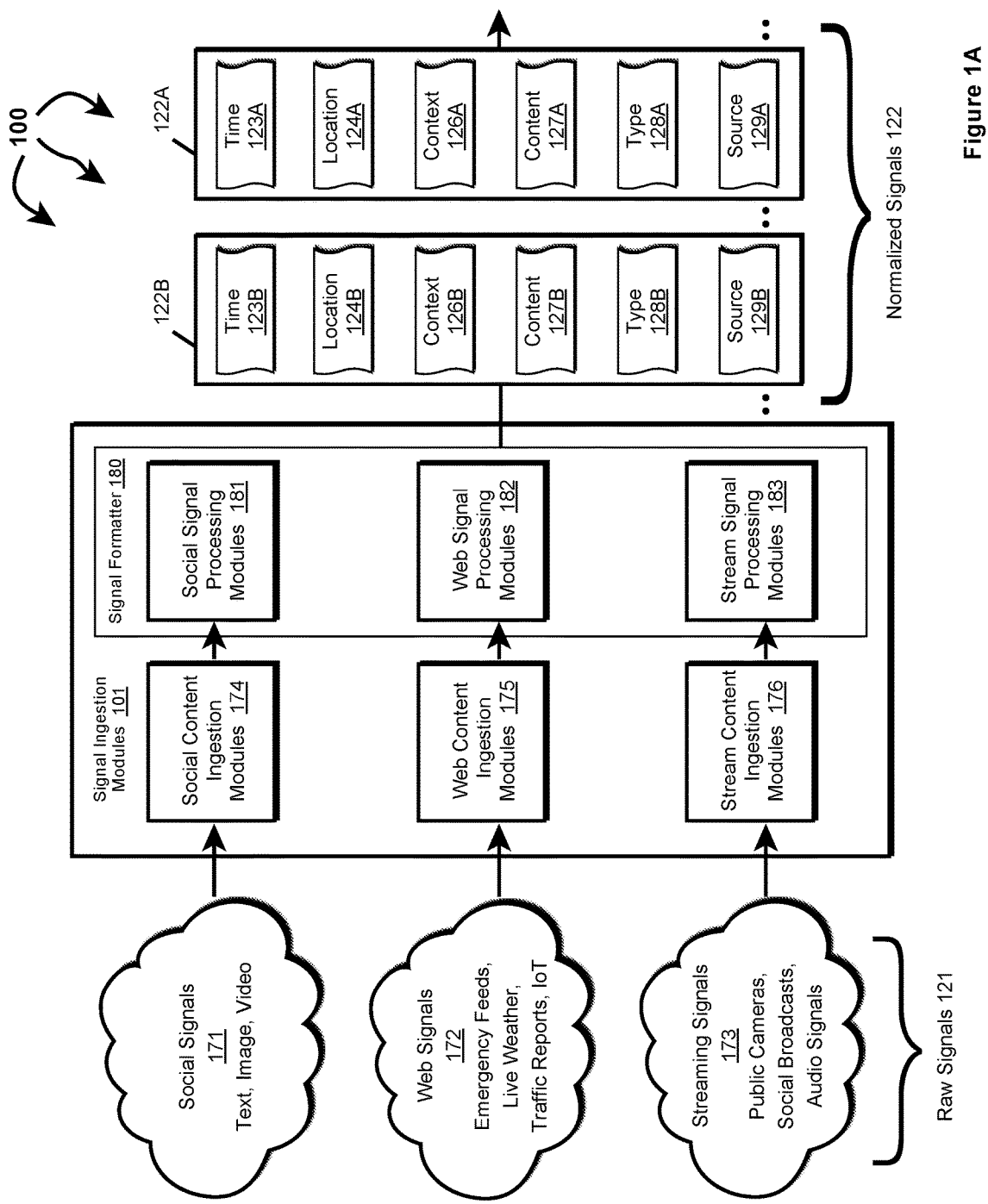
FIG. 1A illustrates an example computer architecture that facilitates normalizing ingesting signals.

Examples extend to methods, systems, and computer program products for normalizing ingested signals.

Entities (e.g., parents, other family members, guardians, friends, teachers, social workers, first responders, hospitals, delivery services, media outlets, government entities, etc.) may desire to be made aware of relevant events as close as possible to the events' occurrence (i.e., as close as possible to "moment zero"). Different types of ingested signals (e.g., social media signals, web signals, and streaming signals) can be used to detect events.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Signal features can include: signal type, signal source, signal content, Time (T) dimension, Location (L) dimension, Context (C) dimension, other circumstances of signal creation, etc.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, signal features, single source probabilities, times, time dimensions, locations, location dimensions, geo cells, geo cell entries, designated market areas (DMAs), contexts, location annotations, context annotations, classification tags, context dimensions, events, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, signal features, single source probabilities, times, time dimensions, locations, location dimensions, geo cells, geo cell entries, designated market areas (DMAs), contexts, location annotations, context annotations, classification tags, context dimensions, events, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatical grid in any form.

In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

| GeoHash Length/Precision | Width × Height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 176, stream content ingestion modules 177, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 176 and web signal processing module 182 can interoperate to normalize web signals 172 into TLC dimensions. Likewise, stream content ingestion modules 177 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC"

dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Event Detection

Figure 1B:
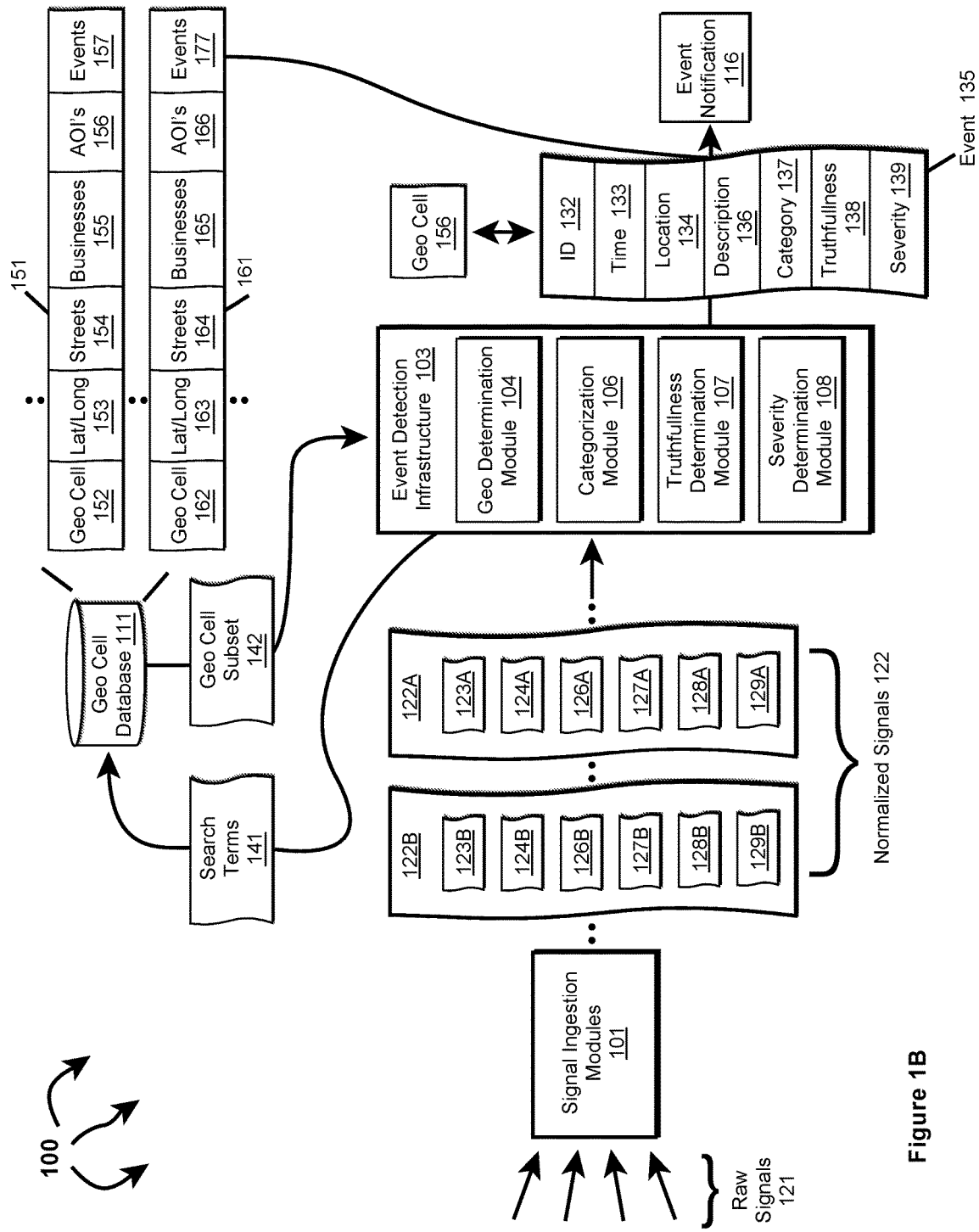
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, a Context dimension in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Figure 2:
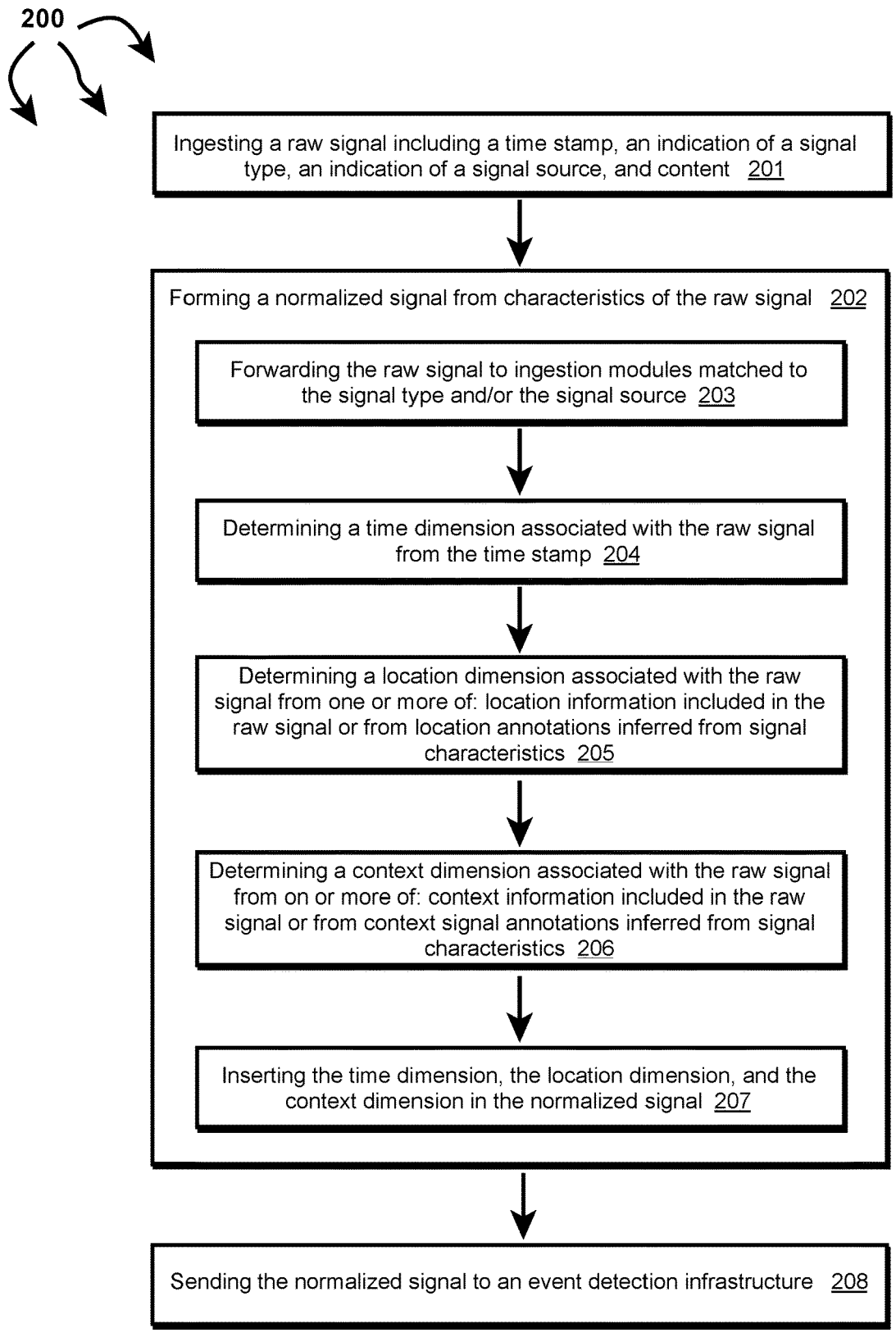
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Figure 3A:
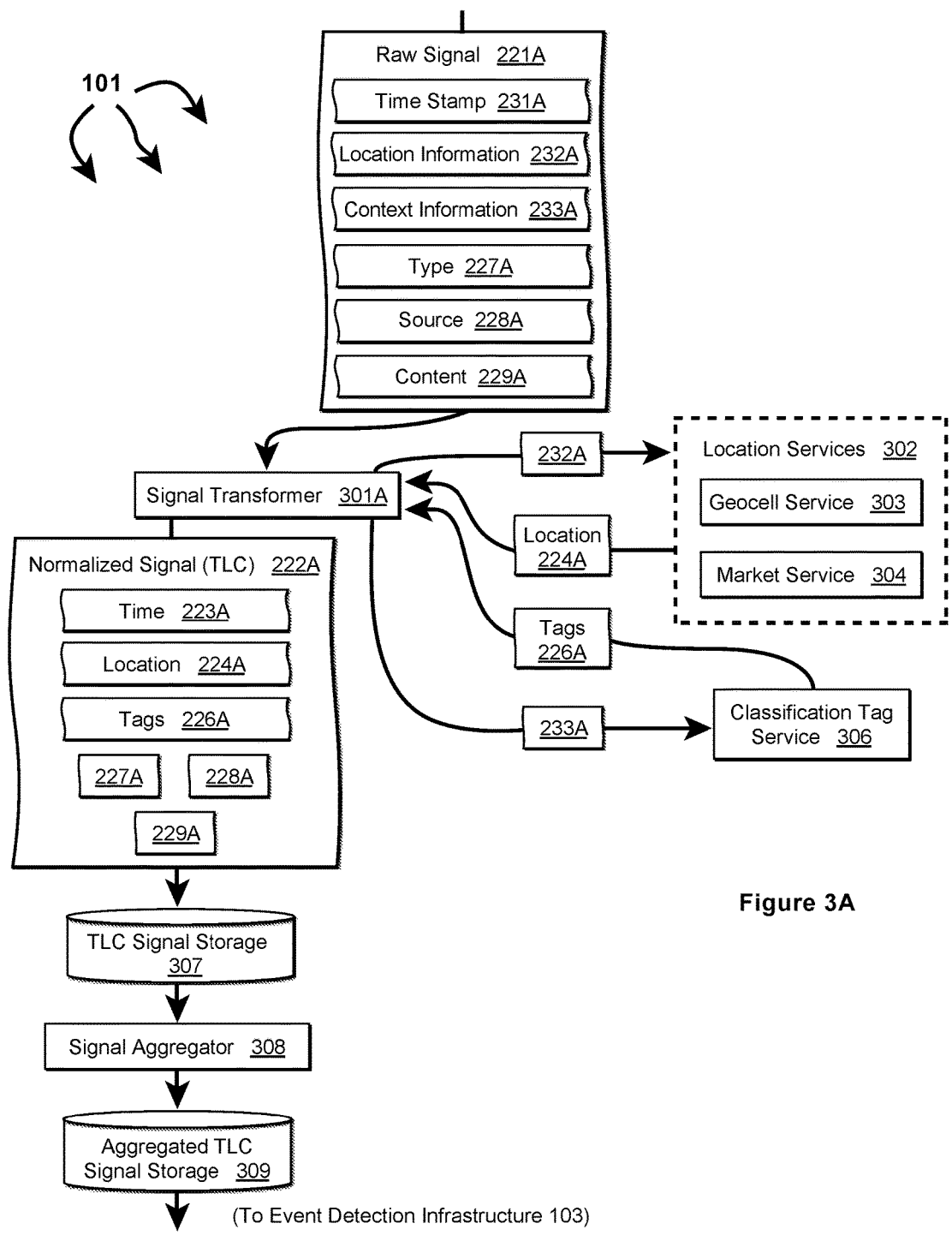
FIGS. 3A, 3B, and 3C illustrate other example components that can be included in signal ingestion modules.
Figure 3B:
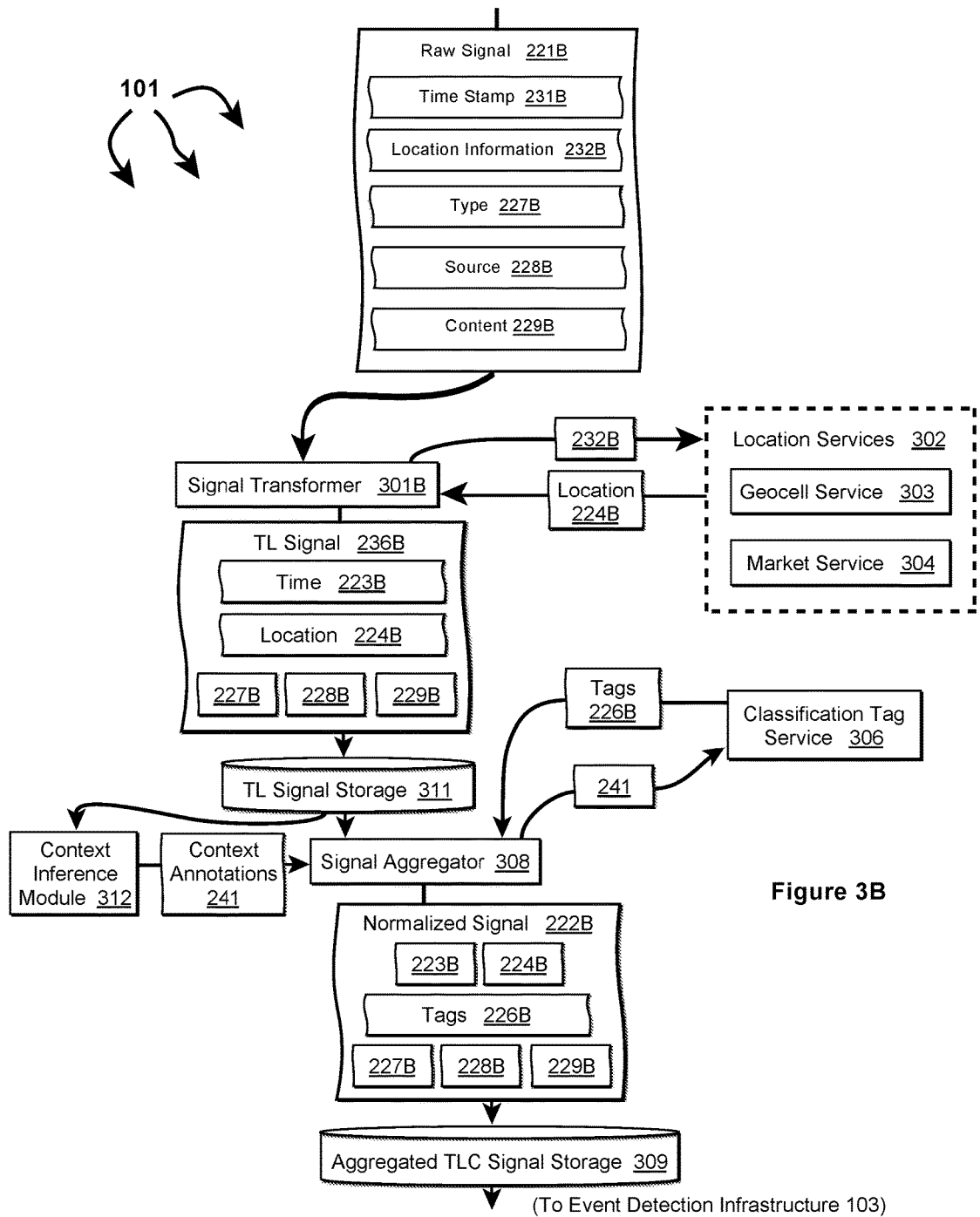
Figure 3C:
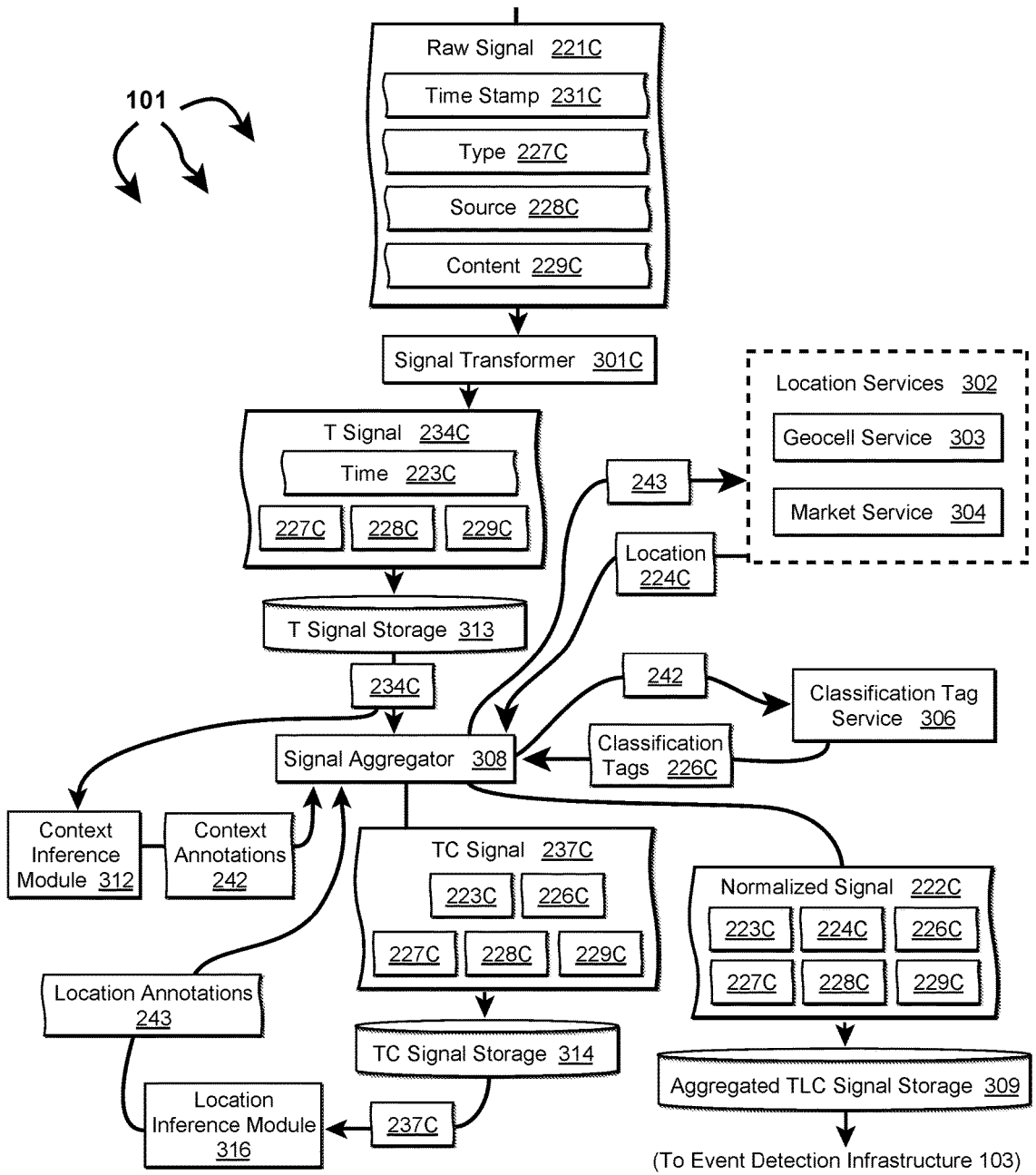

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 176, stream content ingestion modules 177, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

Figure 4:
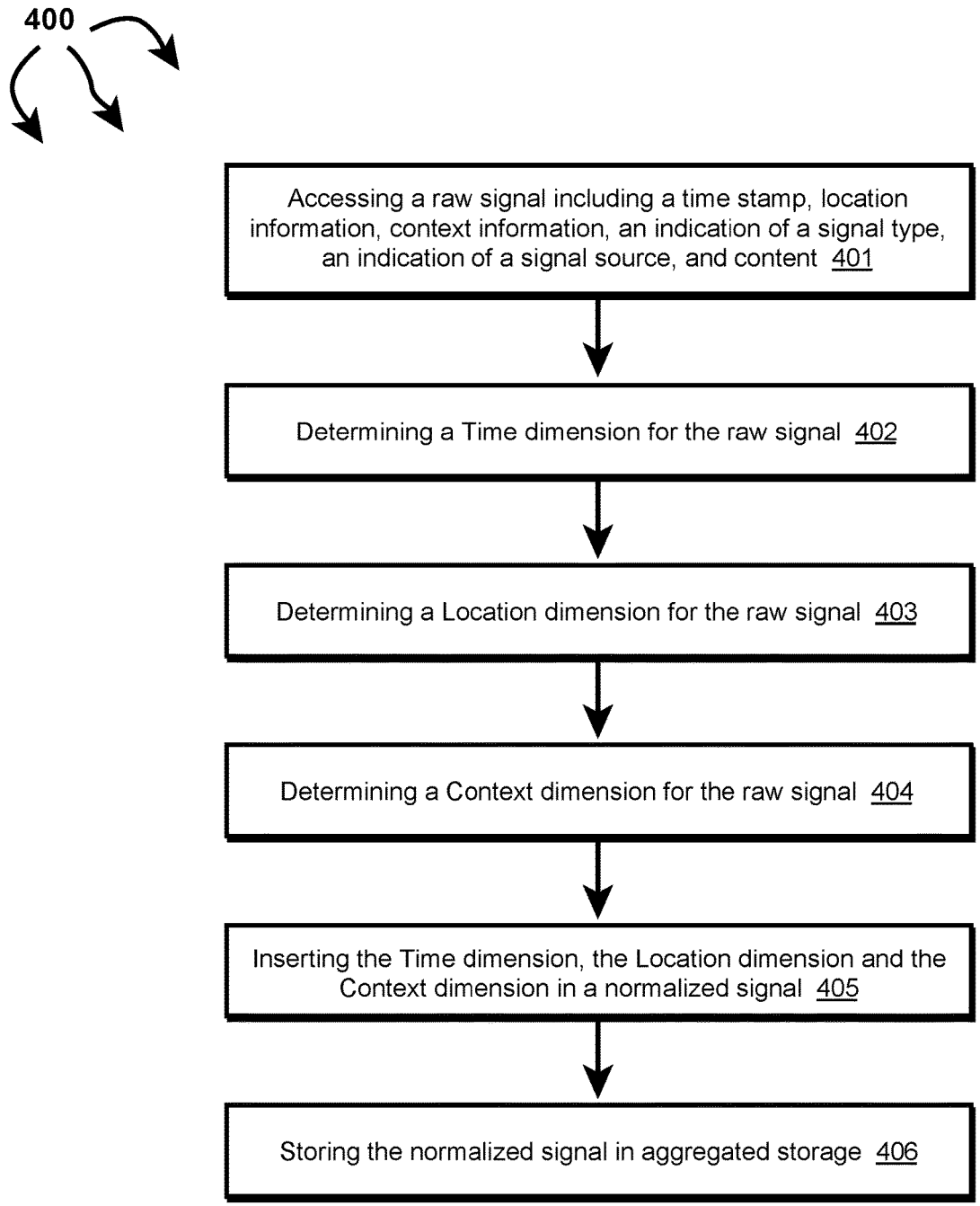
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., Facebook, twitter, Waze, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

Figure 5:
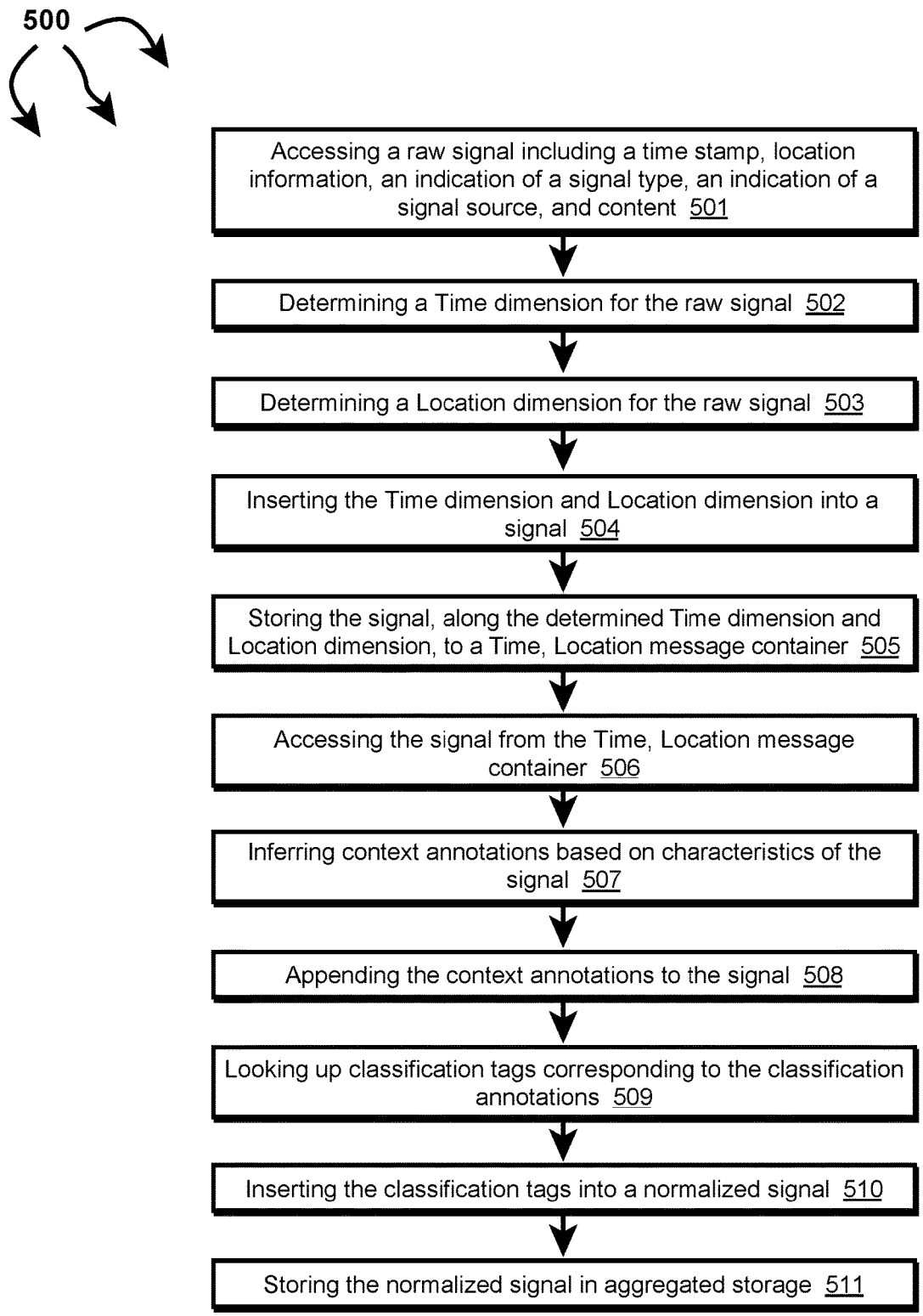
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., Facebook, twitter, Waze, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 212 includes one or more of: NLP modules, audio analysis modules, image analysis modules, video analysis modules, etc. Context inference module 212 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 212 can infer that content 229B is related to a fire. Context inference 212 module can return context annotations 241 to signal aggregator 208.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

Figure 6:
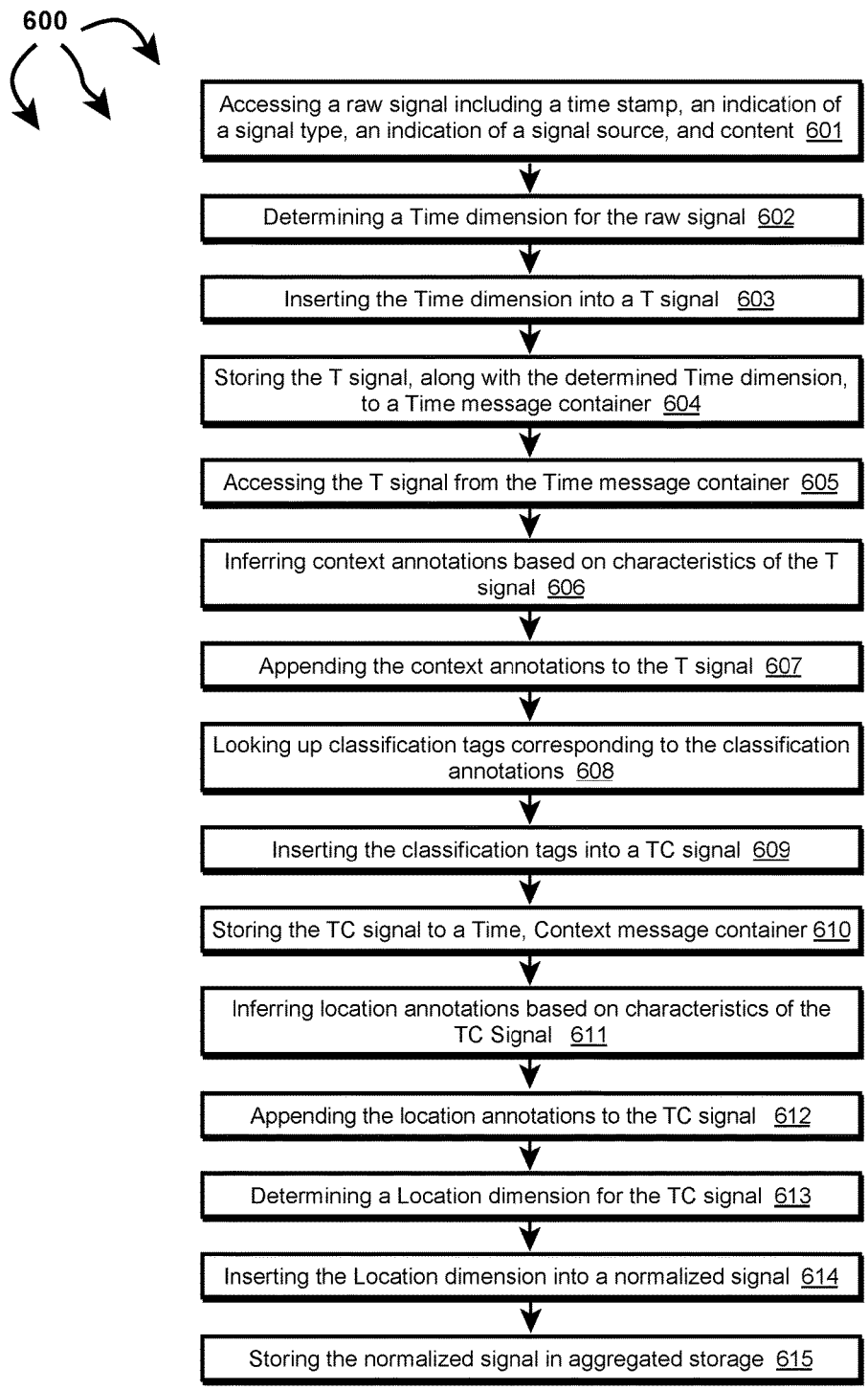
FIG. 6 illustrates a flow chart of an example method for normalizing an ingested signal including time information.

FIG. 6 illustrates a flow chart of an example method 600 for normalizing an ingested signal including time information and location information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., Facebook, twitter, Waze, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 212 can include one or more of: NLP modules, audio analysis modules, image analysis modules, video analysis modules, etc. Context inference module 212 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 212 can infer that content 229C is related to an accident. Context inference 212 module can return context annotations 242 to signal aggregator 208.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 208.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 241, and location annotations 24, can also be included (or remain) in normalized signal 222B).

In another aspect, a Location dimension is determined prior to a Context dimension when a T signal is accessed. A Location dimension (e.g., geo cell and/or DMA) and/or location annotations are used when inferring context annotations.

Accordingly, location services 202 can identify a geo cell and/or DMA for a signal from location information in the signal and/or from inferred location annotations. Similarly, classification tag service 206 can identify classification tags for a signal from context information in the signal and/or from inferred context annotations.

Signal aggregator 208 can concurrently handle a plurality of signals in a plurality of different stages of normalization. For example, signal aggregator 208 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 208 acting as an "air traffic controller" of live data. Signals from multiple sources of data can be aggregated and normalized for a common purpose (e.g., of event detection). Data ingestion, event detection, and event notification can process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
    ingesting a raw signal including a time stamp, an indication of a signal type, an indication of a signal source, and content;
    normalizing the raw signal into a normalized signal by reducing the dimensionality of the raw signal, including:
        determining a time dimension associated with the raw signal from the time stamp;
        inferring location annotations and context annotations from characteristics of the raw signal;
        determining a location dimension associated with the raw signal from one or more of: location information included in the raw signal or the location annotations;
        determining a context dimension associated with the raw signal from one or more of: context information included in the raw signal or the context annotations, including:
            calculating a probability of a real-world event type as a ratio of raw signals turning into real-world events; and
            calculating probability details indicating a probabilistic model used to calculate the probability and features of the raw signal considered in calculating the probability; and
        including the time dimension, the location dimension, the context dimension, the indication of the signal type, the indication of the signal source, and the content in the normalized signal, wherein the context dimension includes the probability and probability details; and
    detecting an occurring real-world event of the real-world event type from the time dimension, location dimension, and context dimension included in the normalized signal; and
    notifying one or more entities about the real-world event.

2. The method of claim 1, further comprising indicating the probability details in a hash field.

3. The method of claim 2, further comprising deriving the hash field.

4. The method of claim 1, wherein detecting an occurring real-world event comprises detecting one of: a fire, police presence, an accident, a natural disaster, weather, a shooter, a concert, or a protest; and
    wherein notifying one or more entities about the real-world event comprises notifying one of: a person, a business entity, or a governmental agency.

5. The method of claim 1, wherein ingesting a raw signal comprises ingesting a raw signal that includes generic source data, the raw signal selected from among: a social signal, a web signal, or a streaming signal; and
    wherein normalizing the raw signal into a normalized signal comprises re-encoding the generic source data into normalized source data having lower dimensionality.

6. The method of claim 5, wherein re-encoding the generic source data into normalized source data having lower dimensionality comprises applying a transdimensionality transform defined in a Time, Location, Context ("TLC") dimensional model to the generic source data.

7. The method of claim 1, wherein calculating a probability of a real-world event type as a ratio of raw signals turning into real-world events comprises calculating the probability as a ratio of raw signals turning into real-world events based on signal properties of the raw signal including: a media type, the signal source, and a geographic type.

8. A computer-implemented method comprising:
ingesting a raw signal including a time stamp, location information, an indication of a signal type, an indication of a signal source, and content;
normalizing the raw signal into a normalized signal, including:
determining a time dimension from the time stamp;
determining a location dimension from the location information;
inserting the time dimension and location dimension into a TL signal;
storing the TL signal in TL message storage;
subsequent to storing the TL signal, accessing the TL signal from the TL message storage;
inferring context annotations based on characteristics of the TL signal, including one or more of: the time dimension, the location dimension, the signal type, the signal source, and the content;
appending the context annotations to the TL signal;
determining a context dimension associated with the TL signal from the context annotations, including:
calculating a probability of a real-world event type as a ratio of raw signals turning into real-world events; and
calculating probability details indicating a probabilistic model used to calculate the probability and features of the raw signal considered in calculating the probability; and
including the time dimension, the location dimension, the context dimension, the indication of the signal type, the indication of the signal source, and the content in the normalized signal, wherein the context includes the probability and probability details; and
storing the normalized signal in TLC message storage; and
detecting an occurring real-world event of the real-world event type from the time dimension, location dimension, and context dimension included in the normalized signal
notifying one or more entities about the real-world event.

9. The computer-implemented method of claim 8, wherein ingesting a raw signal comprises ingesting one of a social signal, a web signal, or a streaming signal.

10. The computer-implemented method of claim 8, wherein determining a location dimension from the location information comprises identifying one or more of: a geo cell and a designated market area (DMA).

11. The computer-implemented method of claim 8, wherein looking up classification tags comprises looking up classification tags corresponding to event types.

12. The computer-implemented method of claim 8, further comprising:
deriving a hash field; and
indicating the probabilistic model and features of the raw signal in the hash field; and
wherein including the probability and probability details in the normalized signal comprises including the hash field in the normalized signal.

13. The computer-implemented method of claim 8, wherein ingesting a raw signal comprising ingesting a raw signal that includes generic source data; and
wherein normalizing the raw signal into a normalized signal comprising applying a transdimensionality transform defined in a Time, Location, Context ("TLC") dimensional model to the generic source data re-encoding the generic source data into normalized source data having lower dimensionality.

14. The computer-implemented method of claim 8, wherein calculating a probability of a real-world event type comprises computing the probability as a ratio of raw signals turning into real-world events based on signal properties of the raw signal including: a media type, the signal source, and a geographic type.

15. A computer system comprising:
a processor;
system memory coupled to the processor and storing instructions configured to cause the processor to:
ingest a raw signal including a time stamp, an indication of a signal type, an indication of a signal source, and content;
normalize the raw signal into a Time, Location, Context ("TLC") normalized signal by reducing the dimensionality of the raw signal, including:
determine a time dimension associated with the raw signal from the time stamp;
infer location annotations and context annotations from characteristics of the raw signal;
determine a location dimension associated with the raw signal from one or more of: location information included in the raw signal or the location annotations;
determine a context dimension associated with the raw signal from one or more of: context information included in the raw signal or the context annotations, including:
calculate a probability of a real-world event type as a ratio of raw signals turning into real-world events; and
calculating probability details indicating a probabilistic model used to calculate the probability and features of the raw signal considered in calculating the probability; and
include the time dimension, the location dimension, the context dimension, the indication of the signal type, the indication of the signal source, and the content in the Time, Location, Context ("TLC") normalized signal, wherein the context dimension includes the probability and probability details; and
detect an occurring real-world event of the real-world event type from the time dimension, location dimension, and context dimension included in the normalized signal; and
notify one or more entities about the real-world event.

16. The computer system of claim 15, wherein instructions configured to cause the processor to detect a real-world event comprise instructions configured to cause the processor to detect one of: a fire, police presence, an accident, a natural disaster, weather, a shooter, a concert, or a protest; and
wherein instructions configured to notify one or more entities about the real-world event comprise instructions configured to cause the processor to notify one of: a person, a business entity, or a governmental agency about the occurring real-world event.

17. The computer system of claim 15, further comprising instructions configured to cause the processor to:
derive a hash field; and
indicate the probabilistic model and features of the raw signal in the hash field; and wherein instructions configured to cause the processor to include the probability and probability details in the Time, Location, Context ("TLC") normalized signal comprise instructions configured to cause the processor to include the hash field in the Time, Location, Context ("TLC") normalized signal.

18. The computer system of claim 15, wherein instructions configured to cause the processor to ingest a raw signal comprise instructions configured to cause the processor to ingest a raw signal that includes generic source data, the raw signal selected from among: a social signal, a web signal, or a streaming signal; and wherein instructions configured to cause the processor to normalize the raw signal into a Time, Location, Context ("TLC") normalized signal comprise instructions configured to cause the processor to apply a transdimensionality transform defined in a Time, Location, Context ("TLC") dimensional model to the generic source data to re-encode the generic source data into normalized source data having lower dimensionality.

19. The computer system of claim 15, wherein instructions configured to cause the processor to calculate a probability of a real-world event type as a ratio of raw signals turning into real-world events comprise instructions configured to cause the processor to compute the probability as a ratio of raw signals turning into real-world events based on signal properties of the raw signal including: a media type, the signal source, and a geographic type.

* * * * *